(12) United States Patent
Kalverkamp et al.

(10) Patent No.: US 9,943,034 B2
(45) Date of Patent: Apr. 17, 2018

(54) PICKING ARRANGEMENT

(71) Applicants: Klemens Kalverkamp, Damme (DE); Felix Kalverkamp, Damme (DE)

(72) Inventors: Klemens Kalverkamp, Damme (DE); Felix Kalverkamp, Damme (DE)

( * ) Notice: Subject to any disclaimer, the term of this patent is extended or adjusted under 35 U.S.C. 154(b) by 0 days.

(21) Appl. No.: 14/896,777

(22) PCT Filed: Jun. 4, 2014

(86) PCT No.: PCT/EP2014/061554
§ 371 (c)(1),
(2) Date: Mar. 25, 2016

(87) PCT Pub. No.: WO2014/198598
PCT Pub. Date: Dec. 18, 2014

(65) Prior Publication Data
US 2016/0198632 A1    Jul. 14, 2016

(30) Foreign Application Priority Data

Jun. 13, 2013    (DE) .................. 10 2013 106 197

(51) Int. Cl.
| | |
|---|---|
| A01D 46/00 | (2006.01) |
| A01D 45/00 | (2018.01) |
| A01D 57/00 | (2006.01) |
| A01D 34/53 | (2006.01) |
| A01D 45/02 | (2006.01) |

(52) U.S. Cl.
CPC .............. *A01D 46/00* (2013.01); *A01D 34/53* (2013.01); *A01D 45/00* (2013.01); *A01D 45/021* (2013.01); *A01D 57/00* (2013.01)

(58) Field of Classification Search
CPC .... A01D 46/00; A01D 45/021; A01D 45/003; A01D 45/04; A01D 45/06; A01D 57/00; A01D 57/22; A01D 34/53
See application file for complete search history.

(56) References Cited

U.S. PATENT DOCUMENTS 3,462,922 A * 8/1969 Phillips .................. A01D 45/00
56/119
5,040,362 A * 8/1991 Morgan ................. A01D 57/22
56/308

(Continued)

FOREIGN PATENT DOCUMENTS

| CN | 2174839 Y | 8/1994 |
| CN | 2341373 Y | 10/1999 |
| CN | 2394418 Y | 9/2000 |

*Primary Examiner* — Alicia Torres
*Assistant Examiner* — Adam J Behrens
(74) *Attorney, Agent, or Firm* — Dinsmore & Shohl LLP

(57) ABSTRACT

A picking apparatus having at least one holder movable in a working direction. The holder has at least one conveying device with a front gathering region. The produce bearing plants come in contact with the conveying device in the front gathering region. The conveying device is operable to gather and transport plants in at least one conveying direction. The conveying direction extend in a straight or substantially straight line and transverse or substantially transverse to the working direction. The picking apparatus also has a picking gap defined behind the conveying device, wherein the plants are guided through the picking gap while separating the produce.

14 Claims, 10 Drawing Sheets

(56) References Cited

U.S. PATENT DOCUMENTS

| | | | | |
|---|---|---|---|---|
| 6,119,443 | A * | 9/2000 | Rauch | A01D 45/021 56/119 |
| 8,104,254 | B2 * | 1/2012 | Luetke-Harmann | A01D 45/021 56/119 |
| 8,578,689 | B2 * | 11/2013 | Luetke-Harmann | A01D 45/021 56/119 |
| 2005/0102843 | A1 * | 5/2005 | Jiang | A01D 34/53 30/240 |
| 2010/0175356 | A1 * | 7/2010 | Kalverkamp | A01D 45/021 56/103 |
| 2010/0300057 | A1 * | 12/2010 | Luetke-Harmann | A01D 45/025 56/119 |
| 2013/0014483 | A1 * | 1/2013 | Luetke-Harmann | A01D 45/021 56/119 |
| 2014/0020355 | A1 * | 1/2014 | Tilly | A01D 45/021 56/103 |

* cited by examiner

PICKING ARRANGEMENT

CROSS-REFERENCE TO RELATED APPLICATIONS

This application claims priority to international patent application Serial No. PCT/EP2014/061554, filed Jun. 4, 2014, which claims priority to international patent application Serial No. DE 10 2013 106 197.4, filed Jun. 13, 2013, the contents of which are incorporated herein in their entirety.

FIELD OF THE INVENTION

The invention relates to a picking apparatus comprising at least one holder which is movable in a working direction and has at least one conveying device with a front gathering region which brings the conveying device into contact with produce-bearing plants by moving the holder in the working direction so that the plants can be gathered by the conveying device and can be conveyed in at least one conveying direction such that the plants are separated from the produce by guiding the plants through a picking gap in the conveying device.

BACKGROUND OF THE INVENTION

DE 197 34 747 A1 discloses a corn harvesting attachment having five conveying disks which are arranged next to one another. These spaced apart conveying disks are configured as dual-disks and rotate about a common axis. Two mutually coaxial removal disks are arranged between the conveying disks on a supporting arm. The regions in which two adjacent conveying disks come closest to one another form the collection regions of the mowing mechanism. They each have a picking unit arranged downstream of them that consists of two picking plates with a picking gap between the picking plates. Two chain conveyors are disposed thereabove which transport the picked corn cobs to the rear. Two parallel picking rollers are supported beneath the picking plates and their cylindrical roller bodies have a conical collection tip at the front to which worm windings are applied. The chain conveyors take the picked cobs further to the rear until they fall into the trough of a transverse screw conveyor which conveys from both sides toward the center where the transfer of the harvested corn cobs to the harvester then takes place.

Removal disks are disposed between the dual disks. This arrangement also has a coaxial blade disk, the associated holders and drive parts, which are heavy and have a large construction size in the direction of travel. Thus the arrangement applies not insignificant load on the harvester, in particular on its axle load. In Germany, however, an approval is required for road use of an axle load. A high axle load may result in a weakening of the ground structure and/or in a sinking of the harvester into the ground.

SUMMARY

The underlying object of the invention is to address the problem of a high axle load.

This objective is achieved by the present invention by a picking apparatus and a method of this disclosure. Other non-limiting embodiments of this invention are also given in the following description.

The picking apparatus of the invention has at least one holder which is movable in a working direction and has at least one conveying device with a front gathering region which brings the conveying device into contact with produce-bearing plants by moving the holder in the working direction so that the plants can be gathered by the conveying device and can be conveyed in at least one conveying direction such that the plants are separated from the produce by guiding the plants through a picking gap, which is provided behind the conveying device in a conveying direction. The conveying device is configured such that the conveying direction extends in a straight line or substantially in a straight line or approximately in a straight line and transversely or substantially transversely or approximately transversely to the working direction in a gathering region. Non-limiting examples of produce/plant product may include fruit, seed heads such as corn cobs, sunflower capitulum/inflorescence etc.

The conveying device extends in a straight line or in a substantially straight line or approximately in a straight line in the gathering region. The conveying direction may extend transversely or substantially transversely or approximately transversely to the working direction in the gathering region. The conveying device can thus be configured as relatively short in the working direction, such that the circular conveying disks exert relatively small load on the harvester. A movement of the picking apparatus and/or of the conveying device in the working direction generally corresponds to a movement of the picking apparatus and/or of the conveying device to the front.

Each plant generally has at least one stalk and each stalk may have one or more attached plant product. The stalks of the plants generally extend perpendicular or approximately perpendicular to the ground. Before the conveying device is brought into contact with the plants, the plants are generally fixed in the ground at one side by their roots and preferably extend upward from them.

A plurality of blades may be provided at and/or fastened to the holder, such that the plants, which are still fixed in the ground, may be gathered and guided towards at least one of the blades by means of the conveying device and be cut by at least one blade. The plants are cut to separate them from their roots, which are located in the ground. The plants may be cut with the blades of the conveying device. The plants may be cut by cutting their stalks close to the ground. The blades may each comprise a cutting edge in order to cut the plants with the conveying device.

The plants, preferably the separated plants, may then be transported and/or conveyed in the conveying direction, in a straight line or substantially in a straight line or approximately in a straight line by the conveying device towards the gathering region. The plants, including the separated plants, may also be transported and/or conveyed in the conveying direction, transversely or substantially transversely or approximately transversely to the working direction by the conveying device towards the gathering region.

The conveying direction may extend in a direction in parallel with or substantially in parallel with or approximately in parallel with the ground in the gathering region. The conveying device may be configured such that the conveying direction extends in a direction in parallel with or substantially in parallel with or approximately in parallel with the ground in the gathering region. The plants, including the separated plants, may be transported and/or conveyed in the conveying direction by the conveying device in a direction in parallel or substantially parallel or approximately parallel with the ground.

The gathering region may extend transverse or substantially transverse or approximately transverse to the working direction. The gathering region may extend over or approximately over the total width of the conveying device or over a substantial portion or over an at least not insignificant portion of this width. The width of the conveying device extends transverse or substantially transverse or approximately transverse to the working direction and/or in parallel with or substantially in parallel with or approximately in parallel with the ground. The gathering region may also extend in parallel or substantially in parallel or approximately in parallel with the ground.

The picking gap is provided at the holder and/or is connected thereto and/or is provided at at least one component connected to the holder. The picking gap may be bounded by lateral margins so that the plants are guidable through the picking gap without the plant product while separating the plant product at the margins. At least two picking plates may be arranged such that these plates have a space between them which defines the picking gap. The picking plates may be provided at the holder and/or are connected thereto and/or are fastened thereto and/or form a part of same. The picking plates may form the one or at least one component connected to the holder. The picking gap may be in an elongated form. The longitudinal axis of the stalk of each plant may be supplied to the picking gap transversely or approximately transversely to the longitudinal axis of the picking gap. The width of the picking gap is such that the plant product does not pass through the picking gap. The width of the picking gap may also be dimensioned such that the stalks pass through the picking gap.

According to an embodiment of the present invention, the longitudinal axis of the picking gap may be oriented transversely or substantially transversely or approximately transversely to the working direction. The longitudinal axis of the picking gap may be oriented in parallel with or substantially in parallel with or approximately in parallel with the ground. A relatively short configuration of the picking apparatus in the working direction is also hereby possible.

According to an alternative embodiment, the longitudinal axis of the picking gap may be oriented in or substantially in or approximately in the working direction. The longitudinal axis of the picking gap may be oriented in parallel with or substantially in parallel with or approximately in parallel with the ground or is inclined with respect thereto, in particular upwardly inclined in the rearward direction. If the longitudinal axis of the picking gap is inclined with respect to the ground, the spacing between the picking gap and the ground increases to the rear.

According to another embodiment, at least one drive is provided to drive the conveying device. The conveying device may be formed as a linear conveyor. The conveying device may form or comprise a cutting screw conveyor which is supported at the holder rotatable about a screw axis. The screw axis of the cutting screw conveyor is a straight axis or a substantially straight axis or an approximately straight axis. The screw axis of the cutting screw conveyor may be oriented transversely or substantially transversely or approximately transversely to the working direction and/or in parallel with or substantially in parallel with or approximately in parallel with the ground. The plants, including the separated plants, can be transported and/or conveyed in the conveying direction, along the screw axis of the cutting screw conveyor by the cutting screw conveyor, generally in the gathering region. The conveying device may alternatively be configured as a traction means conveyor, such as a chain conveyor, or may comprise such a traction means conveyor. The traction means conveyor e.g. has a plurality of fingers or grippers which are arranged spaced apart from one another along a traction means and which may cooperate with the blades for cutting the plants. The grippers may have cutting edges so that such a traction means conveyor may also be called gripping cutters.

The use of a cutting screw conveyor and/or of a linear conveyor, which is e.g. formed by a traction means conveyor, ensures that the conveying direction extends in a straight line or substantially in a straight line or approximately in a straight line in the gathering region. The conveying direction may also extend transversely or substantially transversely or approximately transversely to the working direction in the gathering region; for example, the conveying device may be oriented transversely or substantially transversely or approximately transversely to the working direction and/or the screw axis of the cutting screw conveyor may be oriented transversely or substantially transversely or approximately transversely to the working direction. The non-limiting examples of the linear conveyor may have the cutting screw conveyor and/or the conveying device comprising the cutting screw conveyor and/or the traction means conveyor and/or another conveyor having a straight line conveying direction or a substantially straight line conveying direction or an approximately straight line conveying direction.

The cutting screw conveyor may be drivable by means of the drive, in an upwardly rotating manner viewed from the front, so that the cut plants cannot be drawn beneath the cutting screw conveyor. In some embodiments, the cutting screw conveyor may be rotatingly drivable by means of the drive, in the counter-direction to the working direction.

A cutting angle, which is greater than 0° and less than 90°, may be formed between the screw channel of the cutting screw conveyor and the cutting edges of the blades. The cutting of the plants may be optimized by a suitable choice of the cutting angle. In one embodiment, the cutting angle is between 3° and 20°. In other embodiments, however, the cutting angles of 0° and 90° are also possible.

In yet another embodiment, the screw channel of the cutting screw conveyor may have one or more cutting edges which may cooperate with the cutting edges of the blades for cutting the plants. An improvement of the separating cut can also hereby be achieved. The cutting edges of the screw channel may be provided at its radially outward margin with respect to the screw axis and/or may be formed by one or more sharp edges.

In one embodiment, the blades may be arranged at a spacing from one another in the conveying direction and/or along the screw axis. For a further optimization of the separating cut, the blades may be curved and at least partially engage around the cutting screw conveyor. Thus the plants to be cut may be guided along the cutting edges of the blades during the separating process.

The blades may be curved about the screw axis. The blades may engage beneath the cutting screw conveyor. The blades may extend upwardly with a curved extent from beneath the cutting screw conveyor up to and in front of the cutting screw conveyor. The curved extent of the blades may sweep over an angle of at least 30° or 45°. The cutting edges of the blades may each lie on a plane oriented perpendicular to the screw axis or may be disposed obliquely to this plane.

The blades may comprise a carrying part from which the respective cutting edge projects in the direction of the screw axis. The carrying parts of the blades may be fixedly connected to the holder. The cutting edges may be angled in the direction toward the screw axis with respect to the carrying parts so that the cutting edges each include a clearance angle with a jacket surface, in particular a notional jacket surface, of the cutting screw conveyor. A settling of plant fibers between the cutting screw conveyor and the blades may be prevented by the clearance angle. The feature that the blades are curved and at least partially engage around the cutting screw conveyor also applies to the cutting edges of the blades.

The blades can be of a rigid design. The blades may also be resilient and have a greater curvature about the screw axis in the relaxed state than a jacket surface, in particular a notional jacket surface, of the cutting screw conveyor. This ensures that the blades and the cutting screw conveyor are tensioned with respect to one another during the cut to improve the cutting result. The screw channel presses against the blades during the rotation of the cutting screw conveyor so that said blades are tensioned while reducing their curvature. On a further rotation of the cutting screw conveyor, the screw channel then again allows a springing back of the blades, with the tensioning and relaxing of the blades periodically repeating with a rotating cutting screw conveyor. The blades may consist of spring steel.

In another embodiment, the blades are tensioned against the cutting screw conveyor by one or more springs. The blades are movably supported at the holder. This ensures that the blades and the cutting screw conveyor are tensioned with respect to one another during the cutting to improve the cutting result. The blades may be rigid in this embodiment. The blades may be fastened to the holder by means of the springs. In this case, the springs are in particular leaf springs. The blades can alternatively be supported at the holder in an articulated manner. The springs may be connected between the blades and the holder.

At least one divider tip may be fastened to the holder and may extend to the front, as viewed from the conveying device. In another embodiment, a plurality of divider tips are fastened to the holder at a spacing from one another transversely to the working direction and may extend to the front, as viewed from the conveying device. The divider tips e.g. provide that obliquely standing plants are supplied to specific regions of the conveying device. In yet another embodiment, one or more divider tips are fastened to the blades or are formed in one piece with them.

In another embodiment, one or more divider tips each have a directing device which is provided in a rear region of the respective divider tip with respect to the working direction. Each of the directing devices may be provided on a side of the respective divider tip at the rear in the conveying direction. Each of the directing devices has an angle toward the screw axis of the cutting screw conveyor which may be between 0° and 90°, preferably between 20° and 70°. Each of the directing devices may extend along a straight line which includes an angle with the screw axis of the cutting screw conveyor which may be between 0° and 90°, preferably between 20° and 70°. The respective straight line is disposed in a plane extending perpendicular to or approximately perpendicular to the ground. Each of the directing devices and/or straight lines can, for example, extend in parallel with the ground or can be inclined with respect to it. Each of the directing devices and/or straight lines is preferably inclined against the working direction in the conveying direction. Plants arranged in the region of the directing devices can be gathered by the cutting screw conveyor and can be directed along the directing devices in the direction of the cutting screw conveyor.

In another embodiment of the present invention, a directing device may be formed by a marginal region of the respective divider tip at the rear in the working direction, said marginal region in particular extending inclined against the working direction in the conveying direction. This marginal region may be a marginal region of the respective divider tip at the rear in the conveying direction. The end of each directing device at the front in the working direction preferably merges into a front marginal region of the respective divider tip, said marginal region in particular extending up to the tip of the respective divider tip at the front in the working direction. Each of the front marginal regions may extend from the front end of the respective directing device, preferably in the conveying direction, to the front obliquely to the working direction, and also up to the front tip of the respective divider tip.

In another embodiment, at least one guide is fixedly connected to the holder. The guide is disposed higher than the conveying device and/or the screw axis. The separated plants may be guided by the guide. The separated plants can be supported to the front by the guide. The separated plants can also be supported against a falling forward at or by means of the guide. The guide may be arranged in front of the conveying direction and/or of the screw axis so that the separated plants can be guided between the guide and the conveying device and/or the cutting screw conveyor. The guide can prevent the plants from falling forward. The guide may be disposed higher than the conveying device and/or the screw axis with respect to the ground. If the cutting screw conveyor is rotating upwardly as viewed from the front, this also counteracts a falling forward of the separated plants; however, a better protection against the falling forward of the separated plants can be achieved using the guide.

In yet another embodiment, the guide extends in the conveying direction and/or along the screw axis. The separated plants can thus be prevented from falling forward by the guide during their transport and/or their conveying. The guide may be provided with a plurality of passage openings which are arranged at a spacing from one another in the conveying direction and/or along the screw axis. The passage openings allow plants to enter into the space between the guide and the conveying device and/or the cutting screw conveyor from the front or to move behind the guide.

A plurality of guide elements may be fastened to the holder at a spacing from one another transversely to the working direction and are arranged in front of the conveying device and may extend upwardly.

In another embodiment, the guide comprises the or a plurality of guide elements which are arranged at a spacing from one another in the conveying direction and/or along the screw axis, with the passage openings being provided between the guide elements.

The guide elements may each comprise an upwardly extending and/or vertical lower section and an upper section which extends in the direction of the screw axis and/or which is horizontal, which can also be called a guide section and which also adjoins the lower section. The guide elements, preferably their upper sections, may be inclined, curved and/or angled at least regionally, in their upper regions, in the conveying direction and/or in the direction of the screw axis. The upper section may prevent a falling forward of the separated plants. The guide elements are formed as extensions of the blades and/or of the divider tips. A reduction of components and installation steps in the production of the picking apparatus may thus be achieved. The guide elements may each comprise a free end, such as an upper free end. The free end of each guide element may be provided at its upper section. Each of the guide elements, in particular the lower section thereof, may be fixedly connected to the holder at the bottom and/or each of the guide elements, in particular the lower section thereof, merges at the bottom into one of the blades and/or into one of the divider tips.

In the conveying direction and/or in the direction of the screw axis, two adjacent guide elements may overlap in the passage opening disposed between them. The upper sections of the adjacent guide elements may overlap. Two adjacent guide elements each form a guide element pair. The guide elements of each guide element pair, in particular their upper sections, may overlap in the direction of the screw axis in the passage opening disposed between them. When each guide element pair is viewed in the conveying direction, the guide element at the rear engages behind the guide element at the front. This overlapping and/or engaging behind of the guide elements prevents separated plants from falling forward through the passage opening.

At least one auxiliary transport apparatus may be provided at and/or fastened to the holder and the plants can be gathered above the conveying direction and can be transported with the conveying device by means of the auxiliary transport apparatus. As viewed from the ground, the auxiliary transport apparatus is arranged above the conveying device. The auxiliary transport apparatus may comprise a traction means conveyor such as a chain conveyor or a belt conveyor. The traction means conveyor has a plurality of fingers or grippers which are arranged at a spacing from one another along a traction means to guide the plants in the conveying direction. In an alternative embodiment, the auxiliary transport apparatus has a plurality of conveyor screws. The auxiliary transport apparatus is e.g. drivable by means of the drive of the conveying device and/or by means of a separate drive. The auxiliary transport apparatus and the conveying device, however, may be driven together, i.e. by the drive of the conveying device.

The plants can be supplied to the picking gap in a transfer region. The plants can preferably be led away from the conveying device and can be supplied to the picking gap in the transfer region. The plants can be supplied to the picking gap in the transfer region, by means of a transfer apparatus. The plants can be led away from the conveying device and supplied to the picking gap in the transfer region, by means of the transfer apparatus. The transfer apparatus may be formed by the auxiliary transport apparatus and/or by the conveying device and/or by an additional or separate apparatus. In a non-limiting example, the plants can be supplied to the picking gap by the conveying device and/or by the cutting screw conveyor. In this case, the transfer apparatus is formed by the conveying device and/or by the cutting screw conveyor. The transfer apparatus can be driven by means of the drive of the conveying device and/or by means of the separate drive of the auxiliary transport apparatus. Alternatively, a separate drive may be used to drive the transfer apparatus.

A trough may be fastened to the holder. The plant product is separated at the picking gap and is then introduced into the trough. The separated plant product can be introduced into the trough either actively, e.g. by means of a conveyor, and/or passively, e.g. by means of a slope or a slide. The trough may extend in its longitudinal direction transversely or approximately transversely to the working direction and/or preferably in parallel with or approximately in parallel with the ground. A trough conveyor may also have means to transport the separated plant product within the trough, and in particular towards a removal point. The trough conveyor is e.g. a conveyor screw which is rotatably supported at the holder and which is introduced into the trough or engages into it. The plant product introduced into the trough can be transported by means of the trough conveyor, e.g. in the longitudinal direction of the trough. An inclined conveyor e.g. engages at the removal point and the plant product can be removed from the trough and supplied to the vehicle. The trough conveyor can be driven by means of the drive of the conveying device. Alternatively the trough conveyor can be driven by the separate drive of the auxiliary transport apparatus and/or by the separate drive of the transfer apparatus and/or by another separate drive.

The holder may be installed on a vehicle or forms a part of same, with the vehicle preferably being a motor vehicle. The direction of travel of the vehicle coincides with the working direction, with this direction of travel being the customary direction of forward travel of the vehicle. The holder is installed at the front of the vehicle. The picking apparatus is generally a picking attachment.

In accordance with an embodiment, the drive of the conveying device is provided at or in the vehicle. Alternatively, the drive of the conveying device can also be provided at the holder. The same applies, where present, to the separate drive of the auxiliary transport apparatus and/or of the transfer apparatus and/or of the trough conveyor.

The present invention also relates to a picking arrangement configured as a picking attachment, which is composed of a plurality of picking apparatus of the invention whose holders together form a carrying construction or are provided thereat and/or are fastened thereto. The holders of the picking apparatus can be formed by a common holder which forms the carrying construction. The carrying construction and/or the common holder is/are fastened to a vehicle which may be a motor vehicle. The carrier construction and/or the common holder is/are fastened to the vehicle at the front. The picking apparatus have the same working direction and may be arranged next to one another transversely to said working direction. The picking apparatus may be arranged horizontally next to one another. The picking apparatus are of essentially the same design. Each of the picking apparatus can be further developed in accordance with all the embodiments explained in connection with the picking apparatus of the invention.

The invention further relates to the use of a picking apparatus and/or of a picking arrangement of the invention for a row-independent harvesting of plants. The expression "row-less" may be interchangeably used with "row-independent". The picking apparatus and/or the picking arrangement can be further developed in accordance with all the described embodiments.

A plurality of plants arranged next to one another transversely or approximately transversely to the working direction are simultaneously gathered by the conveyor device or devices. The plants are arranged in a plurality of plant rows, with the working direction in particular extending obliquely or transversely to the direction of the plant rows. The working direction may extend in the direction of the plant rows. The plants may be corn plants so that the plant product is in particular a corn cob. The plants can, however, alternatively also be sunflowers, so that the capitula or inflorescences of the sunflowers form the plant product.

The invention also relates to a method for the harvesting of plants comprising plant product for the row-independent harvesting of plant product, wherein at least one conveying device comprising a front gathering device moves in a working direction relative to the plants and its gathering region is thereby brought into contact with the plants so that they are gathered by means of the conveying device and are conveyed in an or at least one conveying direction, after which the plants are subjected to a picking process for the separating of the plant product; and wherein the conveying device comprises a cutting screw conveyor which rotates about a screw axis oriented transversely or substantially transversely or approximately transversely to the working direction and thus, the plants are gathered and are conveyed along the screw axis. The conveying direction thus in particular extends in the direction of the screw axis. Since the screw axis is a straight axis or a substantially straight axis or an approximately straight axis, the conveying direction extends in a straight line or substantially in a straight line or approximately in a straight line. Since the screw axis may be oriented transversely or substantially transversely or approximately transversely to the working direction, the conveying direction also extends transversely or substantially transversely or approximately transversely to the working direction. The plants, e.g. the separated plants, are thus transported and/or conveyed in the conveying direction, along the screw axis of the cutting screw conveyor by the cutting screw conveyor in the gathering region. A movement of the conveying device and/or of the cutting screw conveyor in the working direction corresponds to a movement of the conveying device and/or of the cutting screw conveyor to the front.

The method of the invention may be carried out using the picking apparatus and/or using the picking arrangement. The method can incorporate all the embodiments of the picking apparatus and/or the picking arrangement as explained in this disclosure. The picking apparatus and/or the picking arrangement can be further developed with all the embodiments explained in connection with the method.

In accordance with a further development, the plants are cut and/or separated at the cutting screw conveyor before the plants are subjected to the picking process. The plants may be guided and/or cut along cutting edges curved about the screw axis for this cutting and/or separating by the cutting screw conveyor. The plants may be cut and/or separated before the plants are subjected to the picking process, by using the cutting screw conveyor with a plurality of curved blades which at least partially engage around the cutting screw conveyor. The blades may comprise the cutting edges. The plants may be separated from their roots located in the ground by the cutting and/or separating the plants. The separated plants may be conveyed along the screw axis by the cutting screw conveyor.

The screw axis may be oriented in parallel with or approximately in parallel with the ground. The working direction is furthermore oriented in parallel with or approximately in parallel with the ground.

The cutting screw conveyor preferably rotates upwardly viewed from the front, and/or is preferably driven upwardly in a rotating manner. In other words, the cutting screw conveyor rotates and/or is rotatingly driven in the counter-direction to the working direction.

The plant product is separated from the plants in the picking process. For this purpose, the plants are supplied to a picking gap and are drawn through it while separating the plant product. The plants may be corn plants so that the plant product is in particular corn cobs. The plants can, however, alternatively also be sunflowers, so that the capitula or inflorescences of the sunflower plant form the plant product.

BRIEF DESCRIPTION OF THE DRAWINGS

The invention will be described in the following with reference to preferred embodiments and to the drawing.

DETAILED DESCRIPTION OF THE INVENTION

Figure 1:
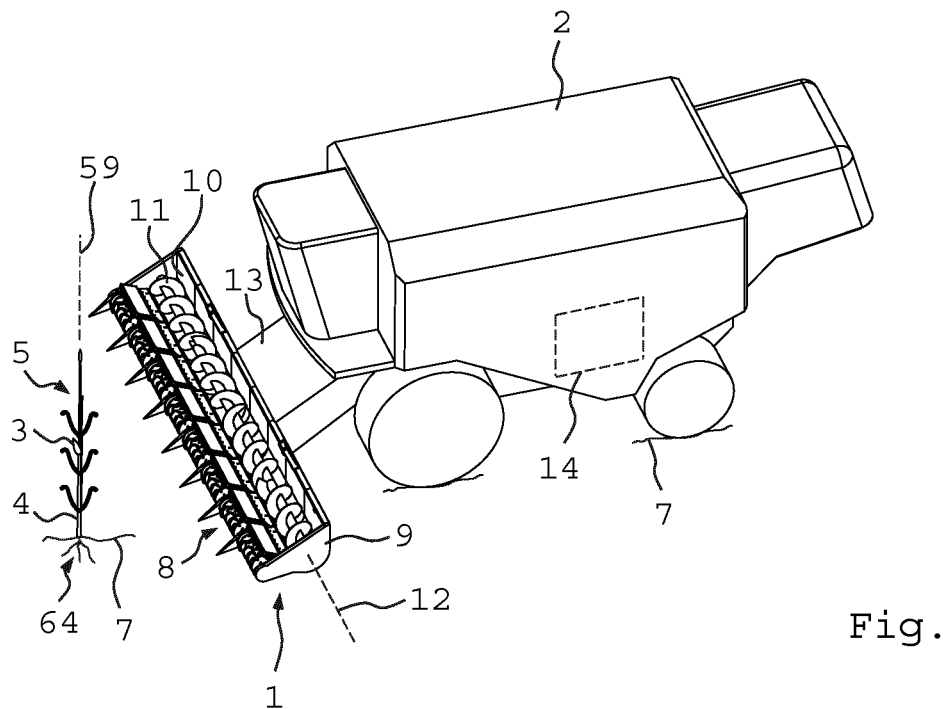
FIG. 1 is a perspective representation of a harvester vehicle with a picking attachment.
Figure 2:
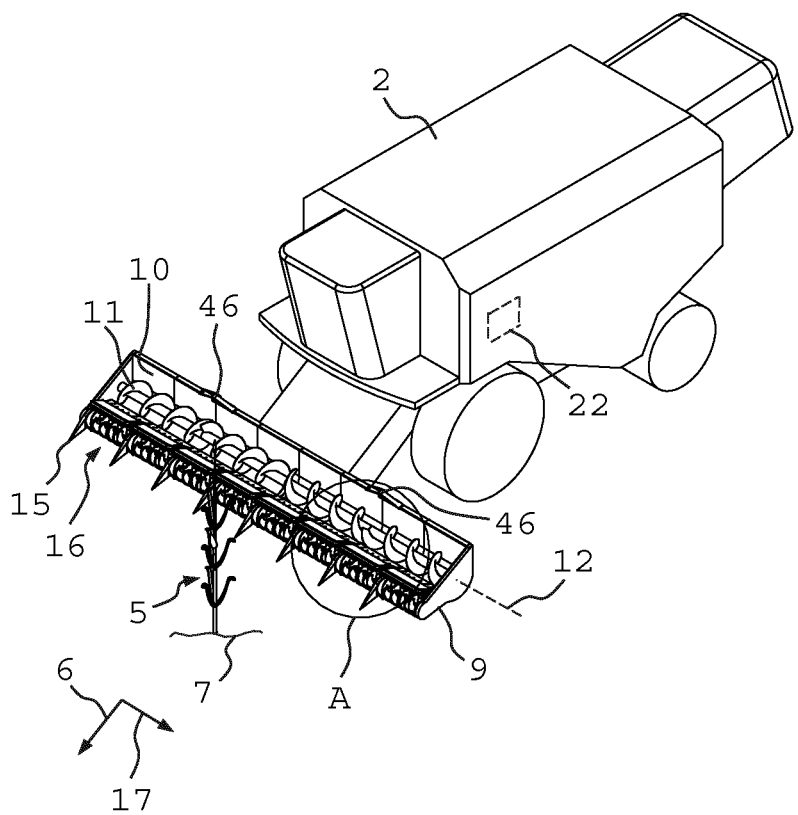
FIG. 2 is another perspective representation of the harvesting vehicle of FIG. 1.

FIGS. 1 and 2 provide perspective views of a picking arrangement in the form of a picking attachment 1 which is fastened to the front of a harvesting vehicle 2. The picking attachment 1 picks plant product 3 which is seated on elongate stalks 4 of plants 5 which are anchored in the ground 7 by roots 64. Non-limiting examples of produce/plant product may include fruit, seed head such as corn cob, sunflower capitulum/inflorescence etc. The stalks 4 each have a pronounced longitudinal direction 59 which extends upward from the ground 7. The picking attachment 1 is moved along the ground 7 in a working direction 6 by the harvesting vehicle 2 so that the plants 5 come into contact with a conveying unit 8 of the picking attachment 1 and are gathered by the conveying unit 8. The working direction 6 may be the forward direction of travel of the harvesting vehicle 2. The picking attachment 1 consists of a carrier construction 9 to which a trough 10 is fastened in which a transverse screw conveyor 11 is arranged. The transverse screw conveyor 11 is rotatably supported about an axis 12 extending transversely to the working direction 6 and is parallel to the ground 7. The transverse screw conveyor 11 transports plant product 3 introduced into the trough 10 from both sides toward the center of the trough 10 where the plant product 3 is transferred to a sloped conveyor 13 of the harvesting vehicle 2 which supplies the plant product 3 to an inner space 14 of the harvesting vehicle 2. The picking attachment 1 has a plurality of divider tips 15 which are each associated with a section or segment 16 of the picking attachment 1. In accordance with this non-limiting embodiment, the picking attachment 1 has eight sections 16 and eight divider tips 15. The sections 16 each form a picking apparatus of a first embodiment of the invention and are arranged next to one another in a transverse direction 17 extending transversely to the working direction 6 and in parallel with the ground 7. The picking apparatus 16 may be of identical or substantially identical design. The transverse direction 17 extends in the transverse vehicle direction of the harvesting vehicle 2.

Figure 3:
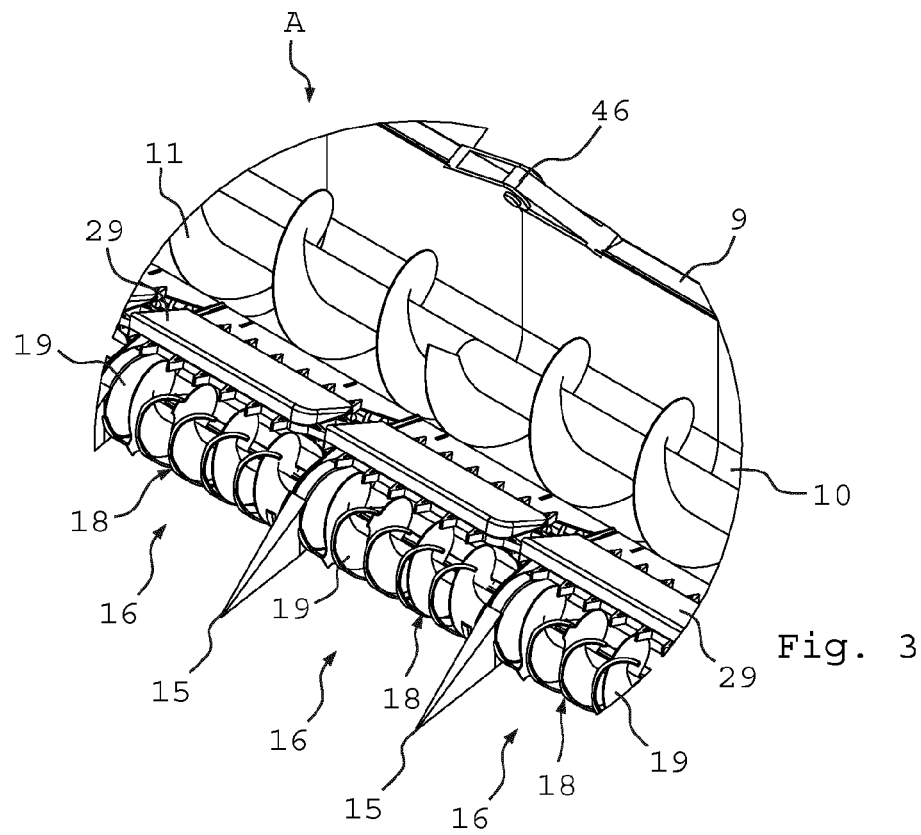
FIG. 3 is a detailed view of a portion of the harvesting vehicle of FIG. 2, marked by A.

An enlarged view of the detail marked "A" in FIG. 2 is shown in FIG. 3, with each of the picking apparatus 16 having a conveying device 18. The conveying devices 18 may each comprise a cutting screw conveyor 19 and together form the conveying unit 8.

Figure 4:
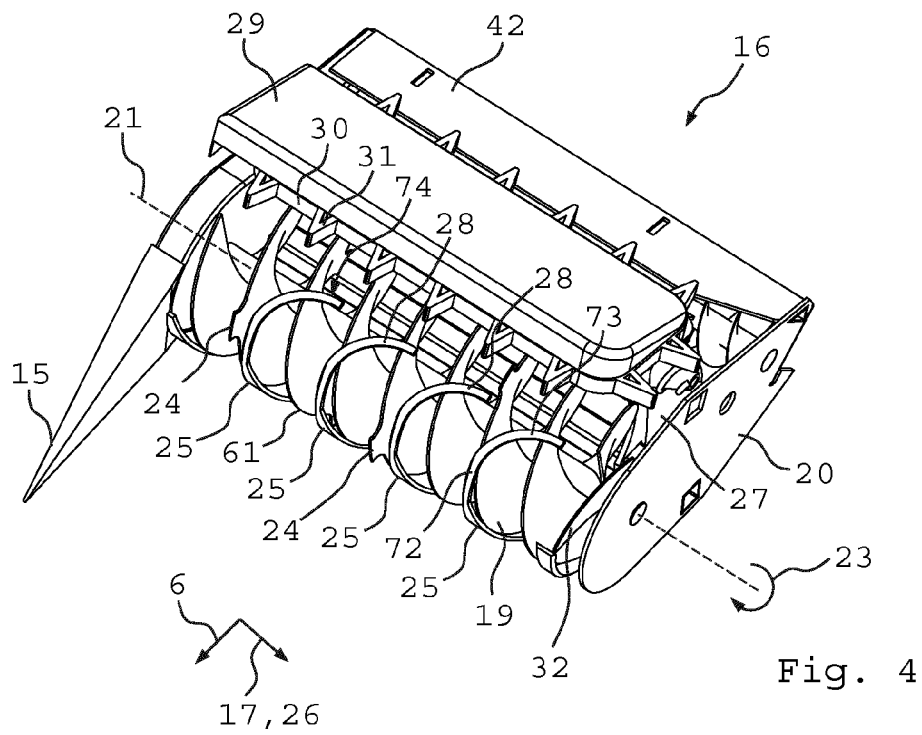
FIG. 4 is a perspective representation of one of the picking apparatus of FIG. 3 in accordance with a first embodiment of the invention.

FIGS. 4 to 7 show different views of one of the picking apparatus 16, with FIG. 4 showing a perspective view of this picking apparatus 16. The picking apparatus 16 comprises a holder 20 which is fastened to the carrying construction 9 and at which the associated cutting screw conveyor 19 is rotatably supported about a screw axis 21. The cutting screw conveyor 19 is rotated about the screw axis 21 in the direction of the arrow 23 by a drive 22 so that the cutting screw conveyor 19 rotates upwardly viewed from the front. The drive 22 is provided in the harvesting vehicle 2 of this embodiment and is schematically indicated in FIG. 2. The cutting screw conveyor 19 has radial projections 24 at its outer periphery which serve the raising of plants standing at an incline or lying. A plurality of blades 25 are furthermore fastened to the holder 20 along the screw axis 21, said blades being curved and partially engaging around the cutting screw conveyor 19. Plants 5 gathered by the cutting screw conveyor 19 are guided toward the blades 25 in the transverse direction 17 by means of the cutting screw conveyor 19 so that the stalks 4 of the plants 5 are cut by the cutting screw conveyor 19 with the blades 25. The conveying direction 26 of the cutting screw conveyor 19 coincides with the transverse direction 17. The cut off plants 5 are then transported further in the conveying direction 26 by the cutting screw conveyor 19 up to a transfer region 27 in which the cut off plants 5 are transported into a rear region of the picking apparatus 16.

To prevent the cut off plants 5 from falling out to the front, a plurality of guide elements 28 are provided which are arranged at a spacing from one another along the screw axis 21, which extend upwardly and which are curved or angled in the conveying direction 26. The guide elements 28 are fastened to the holder 3 and are arranged in front of the screw axis 21 of the cutting screw conveyor 19 and/or in front of the cutting screw conveyor 19. Passage openings 71 are provided between the guide elements 28 (see FIG. 5), through which passage openings the plants 5 can enter into the space between the guide elements 28 and the cutting screw conveyor 19. Each of the guide elements 28 has a lower section 72 extending upwardly and an upper region 73 which extends in the direction of the screw axis 21, which is disposed higher than it and which is angled with respect to the lower section 72 in the conveying direction 26. The passage openings 71 are provided between the upper sections 73 of the guide elements 28. A guide 74 prevents the cut off plants 5 from falling forward and extends along the screw axis 21. The guide 74 is arranged in front of the screw axis 21 and is disposed higher than it is thus formed by the guide elements 28, in particular by the upper sections 73 of the guide elements 28. The cut off plants 5 are guided between the guide 74 and the cutting screw conveyor 19, with the guide 74 holding the cut off plants 5 in contact with the cutting screw conveyor 19. In accordance with this embodiment, the guide elements 28 are formed as extensions of the blades 25, with the lower sections 72 merging into the blades 25.

The cut off plants 5 are transported in the conveying direction 26 by an auxiliary transport apparatus 29 which is here configured as a chain conveyor and has a plurality of fingers 31 arranged at a spacing from one another at a revolving chain 30. The auxiliary transport apparatus 29 is likewise driven by the drive 22.

The screw channel 61 of the cutting screw conveyor 19 is coiled such that, on a rotation of the cutting screw conveyor 19 about the screw axis 21 in the direction of the arrow 23, the plants 5 are transported in the conveying direction 26. However, at the end of the screw channel 61 in the transport direction 26, the cutting screw conveyor 19 has at least one oppositely coiled auger flight 32 so that the plants 5 are raised at this auger flight 32 and are supplied to the transfer region 27. The auxiliary transport apparatus 29 furthermore assists a transport of the plants 5 to the rear in the transfer region 27.

Figure 5:
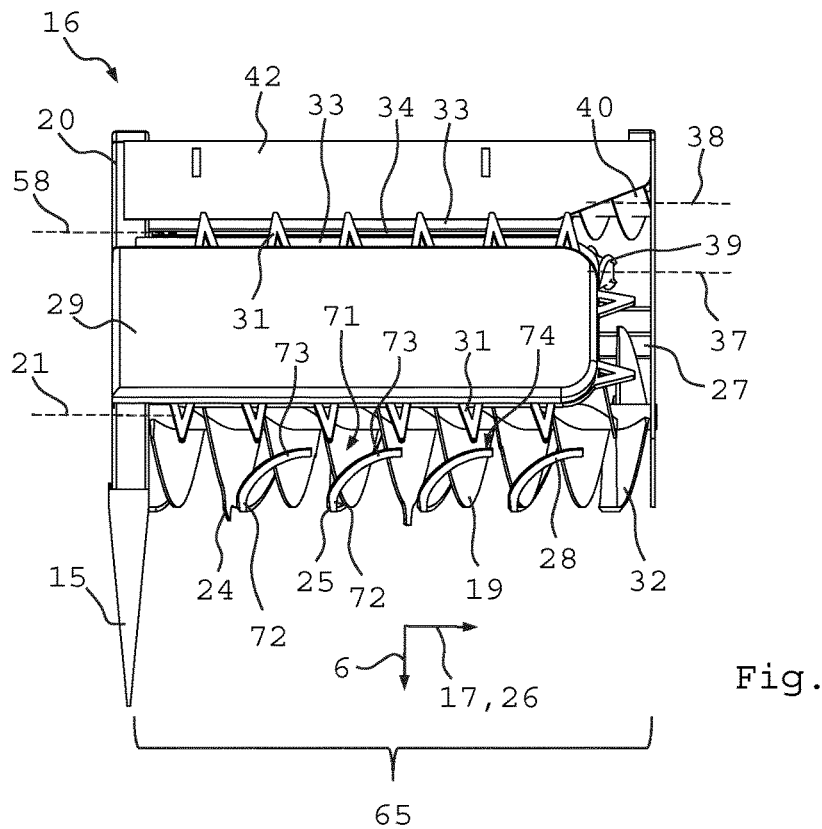
FIG. 5 is a plan view of the picking apparatus of FIG. 4.

A plan view of the picking apparatus 16 can be seen from FIG. 5, wherein two picking plates 33 are fastened to the holder 20 in the rear region of the picking apparatus 16 and bound a picking gap 34 which is disposed between them, which is elongate and extends in the transverse direction 17 and whose longitudinal direction 58 extends in parallel with or approximately in parallel with the screw axis 21. Two picking rollers 35 and 36 are arranged beneath the picking gap 34 (see FIG. 7) and are each supported at the holder 20 rotatable about an axis of rotation 37 and 38 respectively extending in the transverse direction 17. The ends of the picking rollers 35 and 36 facing the transfer region 27 are provided with worm windings 39 and 40 respectively so that the plants 5 transported to the rear in the transfer region 27 are drawn in by the worm windings 39 and 40 against the conveying direction 26 and are supplied to the picking gap 34. The plants are further transported along the picking gap 34 against the conveying direction 26 and takes place by the picking rollers 35, 36 and/or by the auxiliary transport apparatus 29. At the same time, the plants 5 are drawn downwardly, i.e. in the direction of the arrow 41 (see FIG. 7), through the picking gap 34 by means of the picking rollers 36 and 36, with the plant product 3 being scraped off the plants 5 at the margins of the picking plates 33 at the picking gap side since the stalks 4 admittedly pass through the picking gap 34, but not the plant product 3. The separated plant product 3 then slides to the rear along a sloped plate 42 provided at the holder 20 into the trough 10 and is there supplied by means of the transverse screw conveyor 11 to the sloped conveyor 13.

The gathering region 65 of the cutting screw conveyor 19 is indicated in FIG. 5, said gathering region extending over or almost over the total width of the cutting screw conveyor 19.

Figure 6:
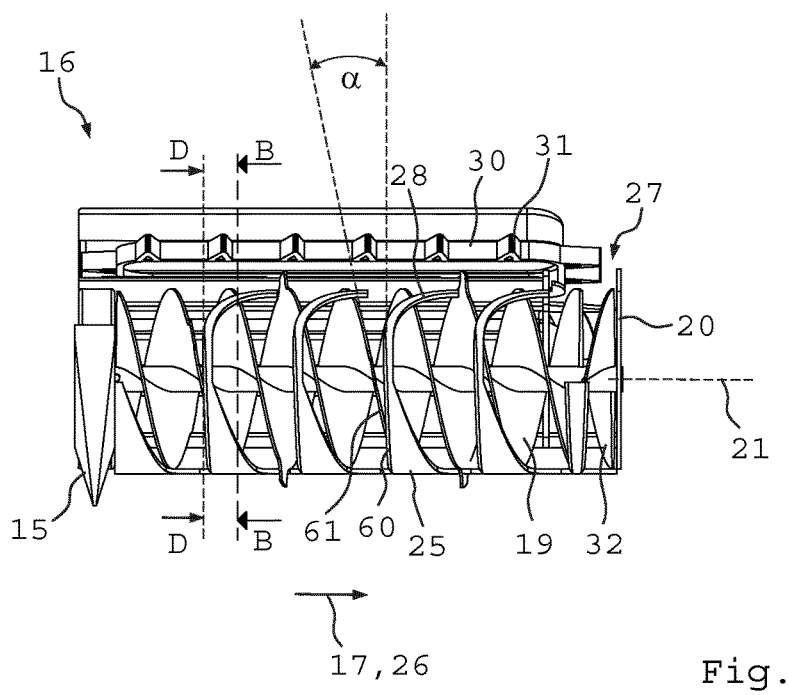
FIG. 6 is a front view of the picking apparatus of FIG. 4.

A front view of the picking apparatus 16 can be seen from FIG. 6, with a cutting angle α being shown between the screw channel 61 and the cutting edges 60 of the blades 25.

Figure 7:
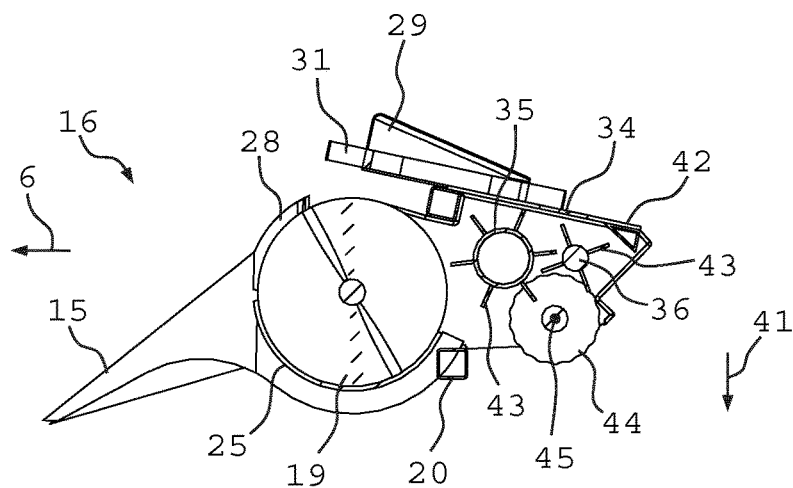
FIG. 7 is a sectional view through the picking apparatus of FIG. 4 along the line B-B of FIG. 6.

FIG. 7 shows a sectional view of the picking apparatus 16 along the line B-B of FIG. 6, with it being able to be recognized that the picking rollers 35 and 36 are each provided with radial projections 43 by means of which the stalks 4 of the plants 5 are gripped and are drawn downwardly through the picking gap 34. Blade disks 44, which are rotated about an axis of rotation 46 extending in the transverse direction 17, are arranged beneath the picking rollers 35 and 36. The plants and/or their stalks are cut and/or split open by means of the blade disks 44 while they are drawn through the picking gap 34. The blade disks 45 and the picking rollers 35 and 36 are rotated about their respective axis of rotation by the drive 22.

Figure 8:
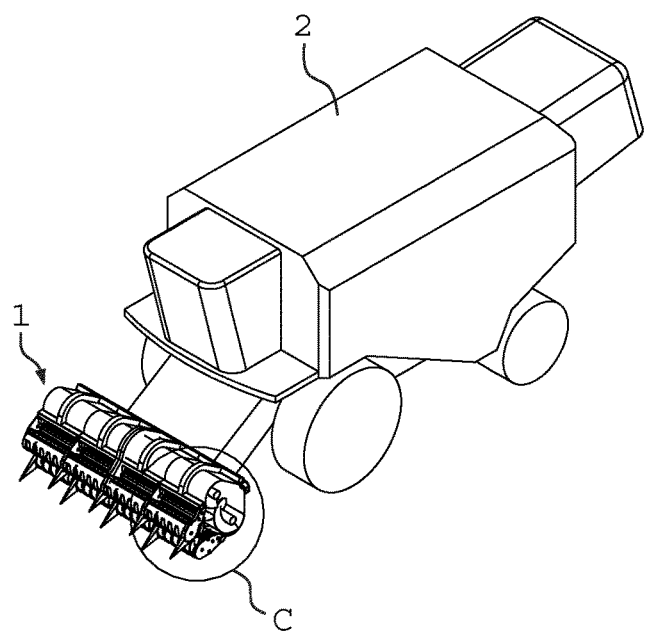
FIG. 8 is a perspective representation of the picking attachment of FIG. 1 in a transport position.
Figure 9:
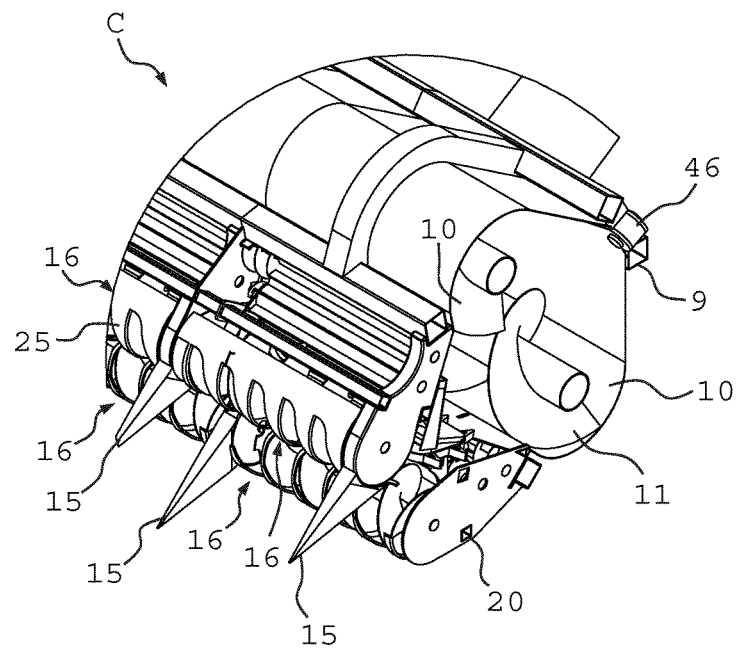
FIG. 9 is a detailed view of a portion of the picking attachment of FIG. 8, marked by C.

A perspective view of the picking attachment 1 in a folded-together state into which the picking attachment 1 can be changed for transport purposes can be seen in FIG. 8. The harvesting vehicle 2 with the picking attachment 1 can thus e.g. drive on public roads on which a maximum vehicle width may not be exceeded. An enlarged representation of the detail of FIG. 8 marked by C can be seen in FIG. 9, wherein hinges 46 are provided at the picking attachment 1 (see also FIG. 2) so that the two outer sections 16 of each side can be folded over onto the middle sections 16.

Other embodiments of the picking apparatus of the invention will be described with reference to FIGS. 10 to 18, with the same reference numerals as in the first embodiment being used for similar or identical features. Furthermore, only differences from the first embodiment are emphasized in the descriptions of the other embodiments so that reference is made to the description of the first embodiment for the further description of the other embodiments.

Figure 10:
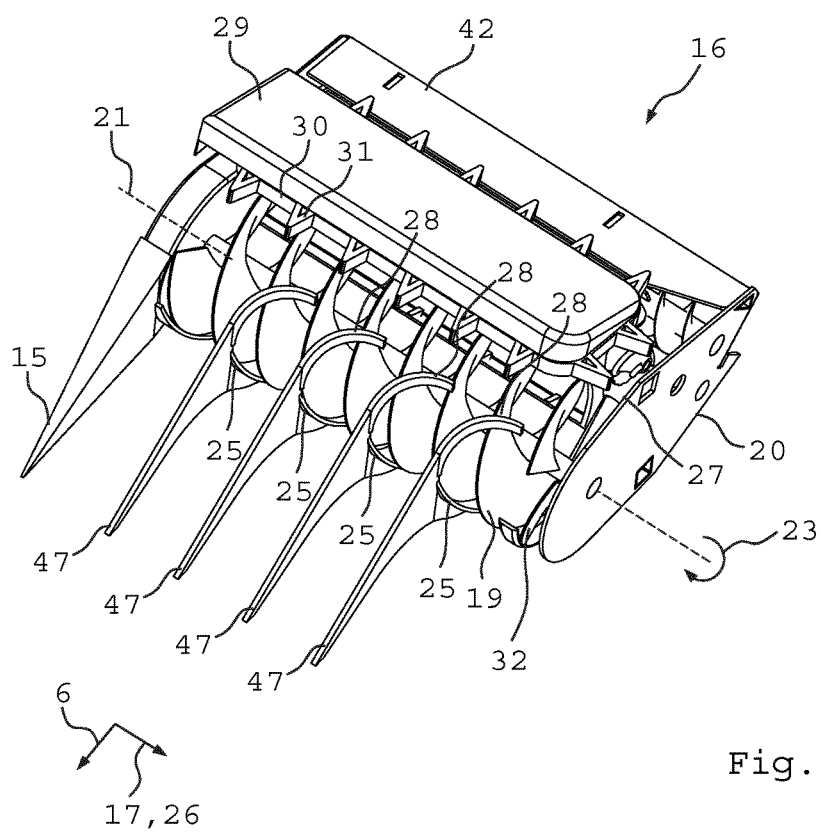
FIG. 10 is a perspective view of a picking apparatus in accordance with a second embodiment of the invention.

A picking apparatus 16 of a second embodiment of the invention can be seen in FIG. 10, wherein, in contrast to the first embodiment, additional divider tips 47 are fastened to the holder 20 which assist a raising of plants standing at an incline. The radial projections 34 provided at the cutting screw conveyor 19 of the first embodiment can thus be dispensed with.

Figure 11:
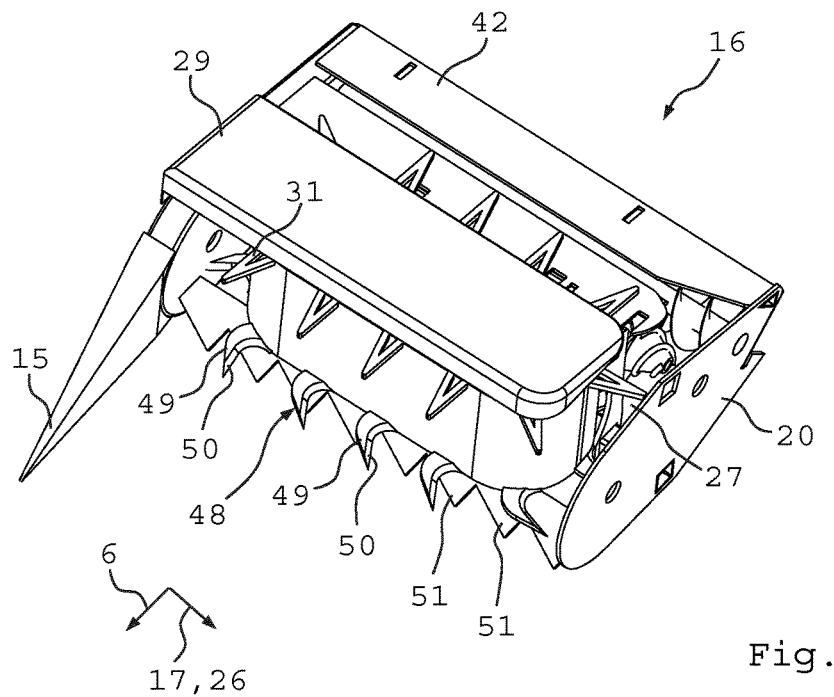
FIG. 11 is a perspective view of a picking apparatus in accordance with a third embodiment of the invention.

A perspective view of a picking apparatus 16 of a third embodiment of the invention can be seen in FIG. 11, with the conveying device 18 being formed by a gripping cutter 48. The gripping cutter 48 is configured as a chain conveyor at whose chain a plurality of grippers 49 are provided which are arranged at a spacing from one another and which each have a cutting edge 50. The grippers 49 grip the stalks of the plants and transport them in a transverse direction 17, with the cutting edges 50 cooperating with blades 51 fastened to the holder 20 for cutting the stalks. The cut off plants are then supplied to the transfer region 27 by the grippers 49 and the fingers 31, with the conveying direction 26 of the gripping cutter 48 coinciding with the transverse direction 17. The plants are then supplied to the rear to the picking gap 34 by the grippers 49 and the fingers 31.

Figure 12:
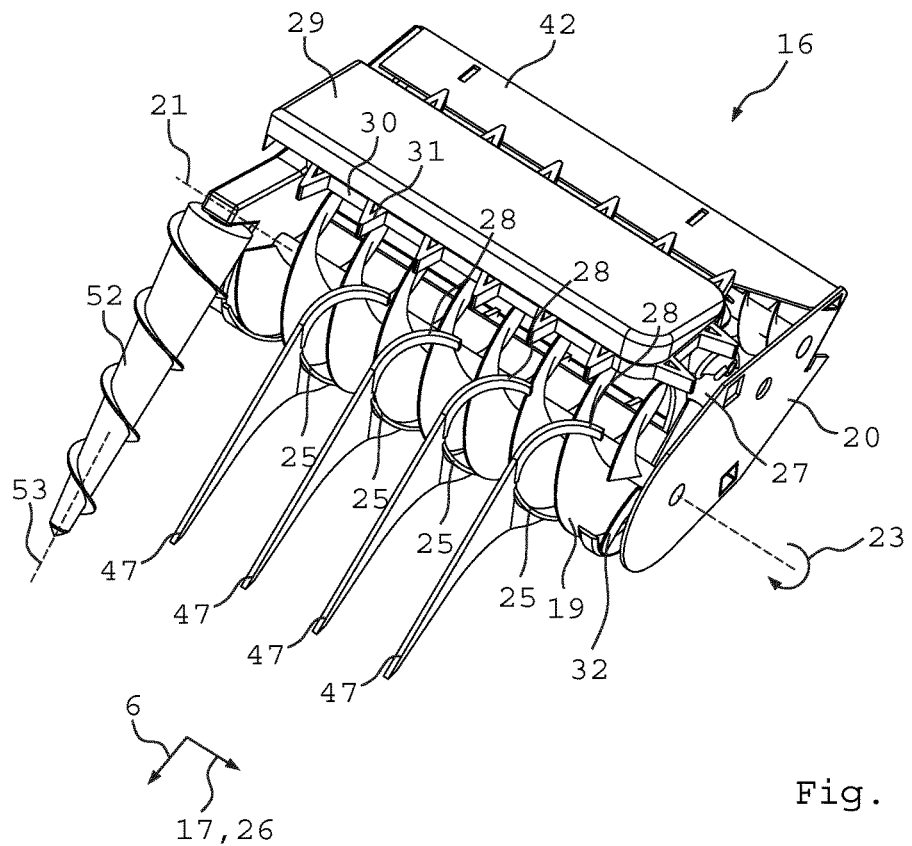
FIG. 12 is a perspective view of a picking apparatus in accordance with a fourth embodiment of the invention.

A perspective view of a picking apparatus 16 of a fourth embodiment of the invention can be seen in FIG. 12, wherein the laterally outwardly disposed divider tip is configured as a conical screw 52. The screw 52 is supported at the holder 20 rotatable about an axis of rotation 53 and is driven by the drive 22 so that the conical screw 52 rotates about the axis of rotation 53. The conical screw 52 raises the lying plants and is also called a down corn lifter. Apart from this, the fourth embodiment corresponds to the second embodiment.

Figure 13:
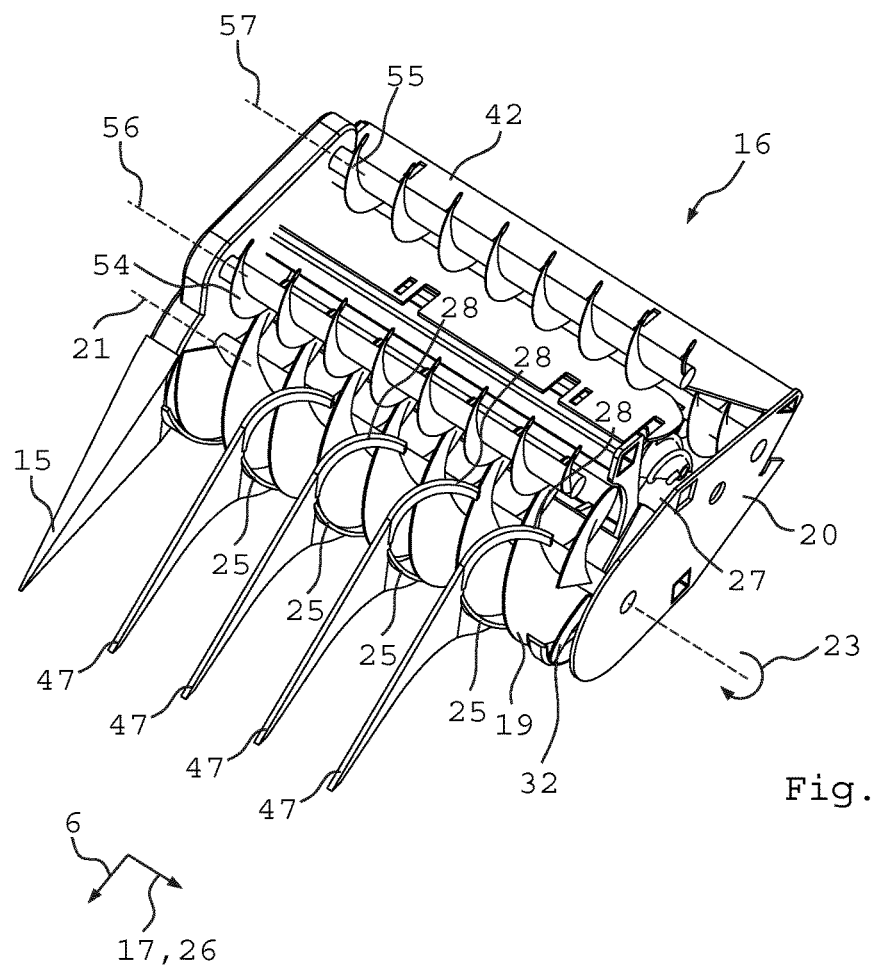
FIG. 13 is a perspective view of a picking apparatus in accordance with a fifth embodiment of the invention.

A picking apparatus 16 of a fifth embodiment of the invention can be seen in FIG. 13, wherein the auxiliary transport apparatus 29 is formed by a plurality of screw conveyors 54, 55. The screw conveyors 54 and 55 are each supported at the holder 20 rotatable about an axis of rotation 56 and 57 respectively. The screw conveyors 54 and 55 are driven by the drive 22 and thus rotate about their axes of rotation 56 and 57 respectively. The screw conveyor 54 assists the conveying device 18 formed by the cutting screw conveyor 19, whereas the screw conveyor 55 transports the plants seated in the picking gap in the longitudinal direction of the picking gap and indeed in a direction opposite to the conveying direction 26 of the conveying device 18.

Figure 14:
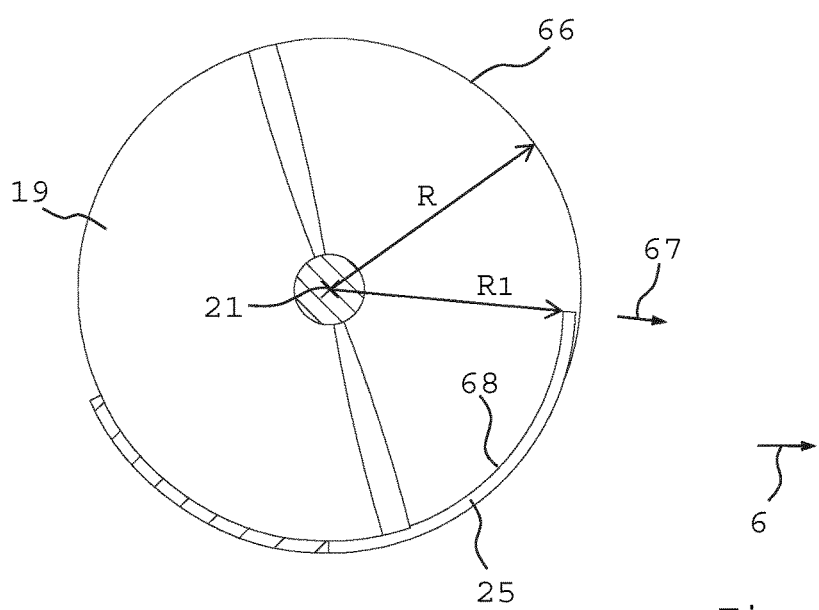
FIG. 14 is a sectional view through the cutting screw conveyor along the line D-D of FIG. 6 in accordance with a modification of the first embodiment.

A sectional view through the cutting screw conveyor 19 along the line D-D of FIG. 6 can be seen in FIG. 14, which illustrates a modification of the first embodiment. In contrast to the first embodiment, the blades 25 are resilient and have a greater curvature about the screw axis 21 in the relaxed state than a jacket surface 66, in particular a notional jacket surface, of the cutting screw conveyor 19. The spacing R1 between the screw axis 21 and the free ends of the relaxed blades 25 is thus smaller than the spacing R between the screw axis 21 and the outer margin of the screw channel 61 which lies on the jacket surface 66 whose radius corresponds to the spacing R. This has the consequence that each of the blades 25 is elastically deformed in the direction of the arrow 67 which extends approximately radially with respect to the screw axis 21 when the screw channel 61 sweeps over the inner surface 68 of the respective blade 25 facing the cutting screw conveyor 19 due to the rotation of the screw cutting conveyor 19. After the inner surface 68 has been swept over by the screw channel 61, the respective blade 25 returns back to the position, as shown in FIG. 14, due to its elasticity. The radial projections 24 are omitted in this modification, but can be present. The same applies accordingly to the guide elements 28.

Figure 15:
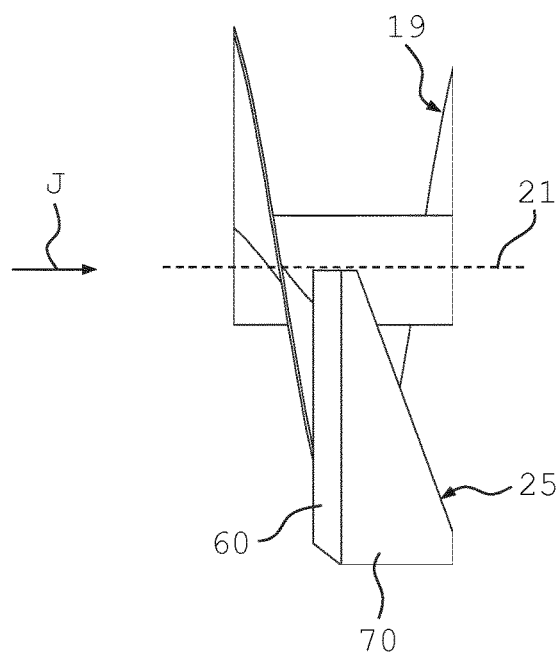
FIG. 15 is a sectional front view of a cutting screw conveyor of a picking apparatus in accordance with a sixth embodiment of the invention.
Figure 16:
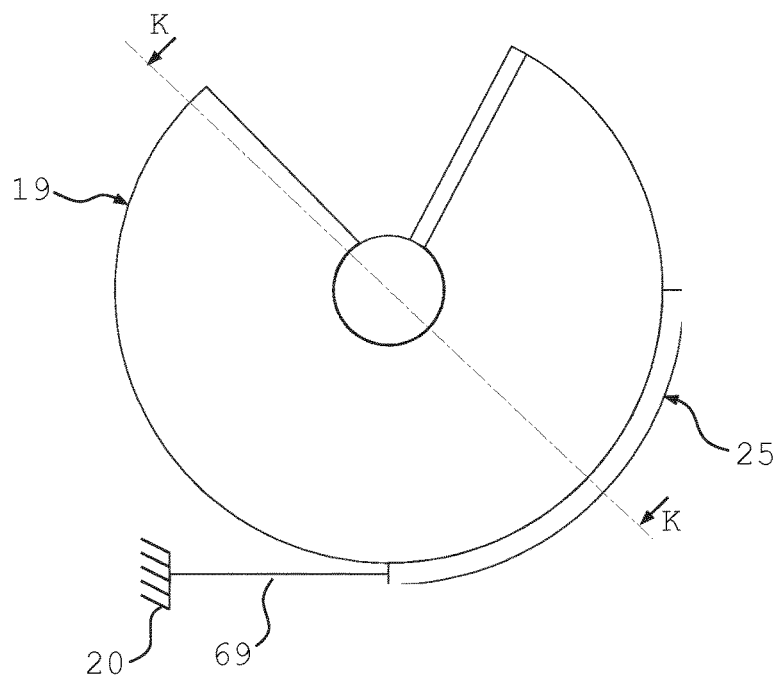
FIG. 16 is a view of the section which can be seen in FIG. 15 in the direction of the arrow J.
Figure 17:
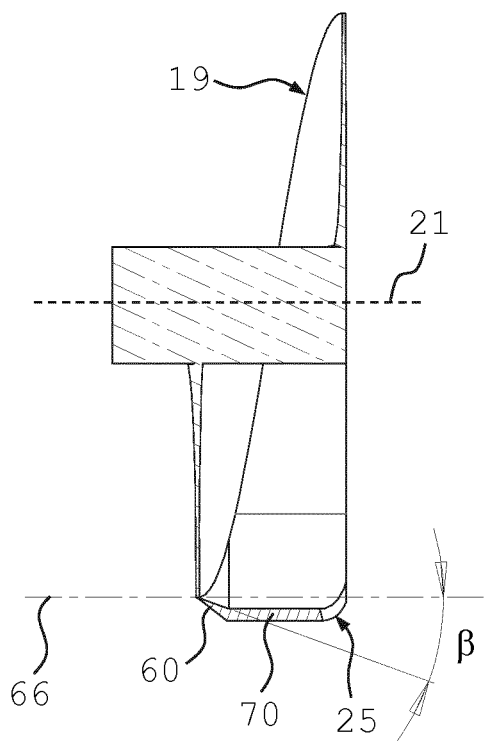
FIG. 17 is a sectional view of the cutting screw conveyor along the line K-K of FIG. 16.

A sectional front view of a cutting screw conveyor 19 of a picking apparatus of a sixth embodiment of the invention can be seen in FIG. 15, with FIG. 16 showing a side view of the section shown in FIG. 15 in the direction of the arrow J. FIG. 17 further shows a sectional view of the cutting screw conveyor 19 along the line K-K shown in FIG. 16. In accordance with the sixth embodiment, the blades 25 are each fastened to the holder 20 only shown schematically by a leaf spring 69, with the blades 25 being tensioned against the cutting screw conveyor 19 by the leaf springs 69.

The blades 25 furthermore each comprise a carrying part 70 and a cutting edge 60 which projects from the carrying part 70 in the direction of the screw axis 21. The cutting edges 69 are angled in the direction toward the screw axis 21 with respect to the carrying parts 70 so that the cutting edges 60 each include a clearance angle $\beta$ with a jacket surface 66, in particular a notional jacket surface, of the cutting screw conveyor 19. Such a clearance angle can also be provided in the other embodiments.

Only one of the blades is admittedly shown in FIGS. 15 to 17; however, corresponding views result for the other blades.

Figure 18:
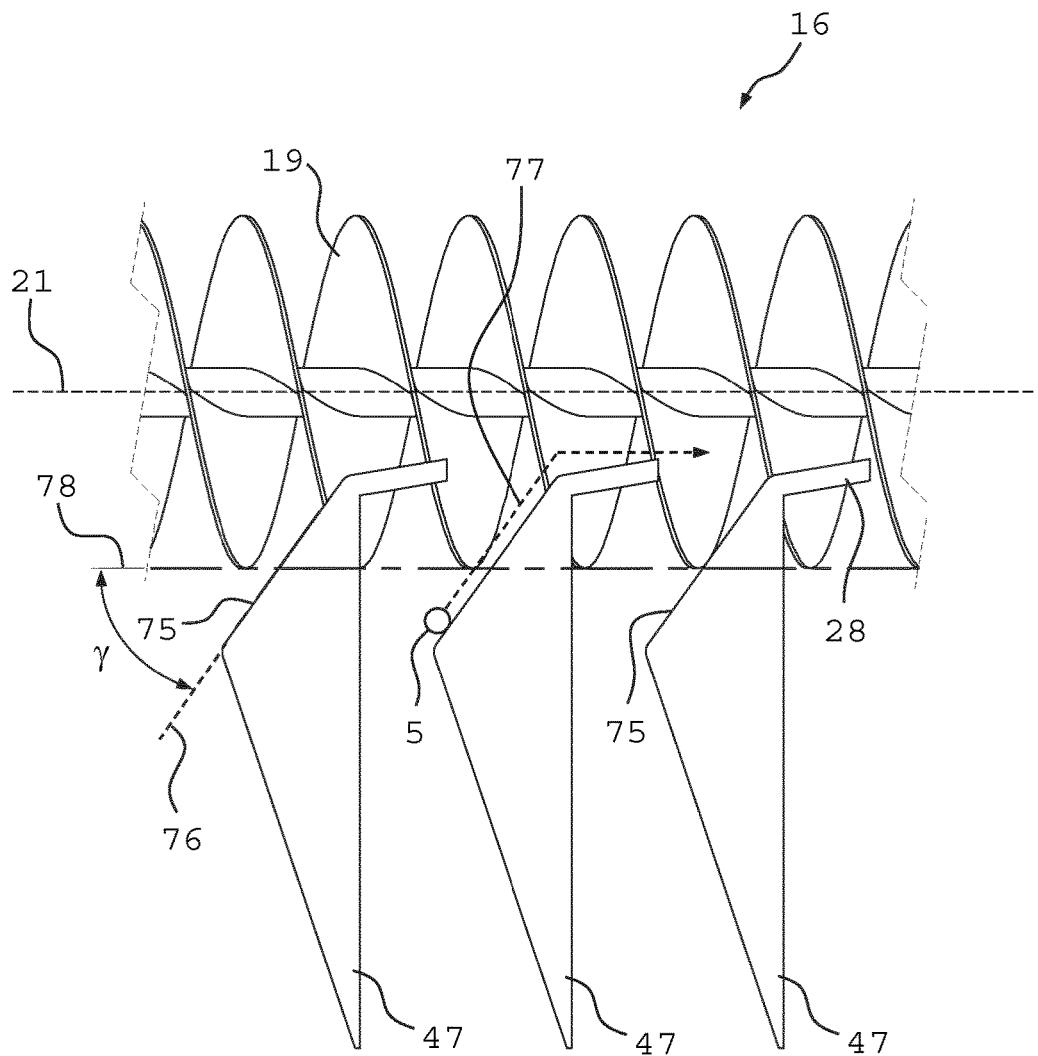
FIG. 18 is a partial representation of a picking apparatus in accordance with a seventh embodiment of the invention in a plan view.

A schematic and only partial representation of a picking apparatus 16 of a seventh embodiment of the invention can be seen in a plan view of FIG. 18, with additional divider tips 47 being fastened to the holder 20. The seventh embodiment is thus based on the second embodiment. Unlike the second embodiment, the divider tips 47 each comprise a directing device 75 at their rear regions, by these directing devices the plants 5 can be directed toward the cutting screw conveyor 19 and/or into the screw 19 (i.e. between its auger flights). Each directing device 75 lies on a straight line 76 which extends at an angle $\gamma$ to the screw axis 21, said angle here being at approximately 55° (the angle $\gamma$ in FIG. 18 is drawn between the straight lines 76 and a straight line 78 in parallel with the screw axis 21). In the seventh embodiment, the directing devices 75 are each formed by a marginal region of the respective divider tip 47 at the rear in the working direction 6 and at the rear in the conveying direction 26. A plant 5 arranged in the region of one of the directing devices 75 can thus be gathered by the screw 19 as soon as it moves into the gathering region of the screw 19 and can be directed along the respective directing device 75 toward the screw axis 21, after which the plant 5 is transported further in the conveying direction 26 by the screw 19, which is indicated by the dashed arrow 77. Apart from this, the seventh embodiment matches or substantially matches the second embodiment.

Figure 19:
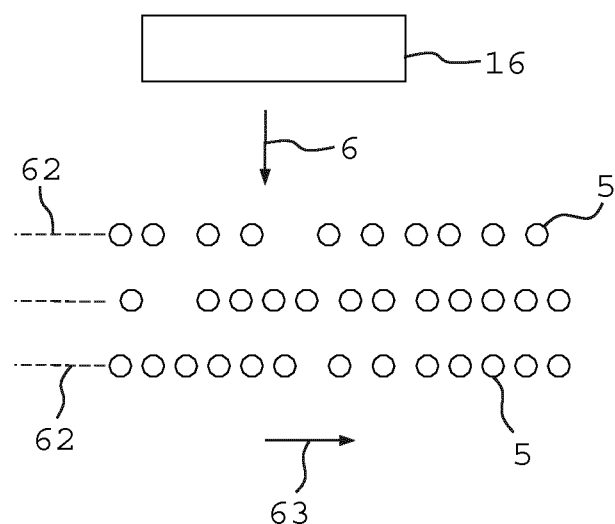
FIG. 19 is a schematic plan view of a picking apparatus in accordance with the invention and of a plurality of plant rows.

A schematic plan view of a picking apparatus 16 of this invention and of a plurality of plant rows 62, which extend in the direction 63, can be seen in FIG. 19. The picking apparatus 16 of the invention may be configured in accordance with any of the embodiments, to orient the working direction 6 transversely or obliquely to the direction 63 of the plant rows 62 so that the plants 5 can be harvested in a row-independent manner.

REFERENCE NUMERAL LIST 1 picking attachment
2 harvesting vehicle
3 plant product
4 stalks
5 plant
6 working direction
7 ground
8 conveying unit
9 carrying construction
10 trough
11 transverse screw conveyor
12 axis of rotation of the transverse screw conveyor
13 sloped conveyor
14 inner space
15 divider tip
16 segment, picking apparatus
17 transverse direction
18 conveying device
19 cutting screw conveyor
20 holder
21 screw axis
22 drive
23 direction of rotation of the cutting screw conveyor
24 radial projection at the cutting screw conveyor
25 blade
26 conveying direction
27 transfer region
28 guide element
29 auxiliary transport apparatus
30 chain
31 finger
32 auger flight, oppositely coiled
33 picking plate
34 picking gap
35 picking roller
36 picking roller
37 axis of rotation of the picking roller
38 axis of rotation of the picking roller
39 worm winding of the picking roller
40 worm winding of the picking roller
41 downward direction
42 oblique plate
43 radial projection
44 blade disk
45 axis of rotation of the blade disk
46 hinge
47 additional divider tip
48 gripping cutter
49 gripper
50 cutting edge
51 blade
52 conical screw
53 axis of rotation of the conical screw
54 screw conveyor
55 screw conveyor
56 axis of rotation
57 axis of rotation
58 longitudinal axis of the picking gap
59 longitudinal axis of the stalk
60 cutting edge
61 screw channel
62 plant row
63 direction of the plant rows
64 root of the plant
65 gathering region of the conveying device
66 notional jacket surface of the cutting screw conveyor
67 direction of elastic deformation
68 inner surface of the blade
69 leaf spring
70 carrying part of the blade
71 passage opening between two guide elements
72 lower section of the guide element
73 upper section of the guide element
74 guide
75 directing device
76 straight line
77 arrow
78 straight line, in parallel with the screw axis
$\alpha$ cutting angle
$\beta$ clearance angle
$\gamma$ angle
R spacing/radius
R1 spacing

The invention claimed is:

1. A picking apparatus comprising:
at least one holder movable in a working direction, the holder having at least one conveying device with a front gathering region, the conveying device comprising a cutting screw conveyor rotatable about a screw axis, wherein produce bearing plants come in contact with the cutting screw conveyor in the front gathering region, the cutting screw conveyor being operable to gather and transport plants along the screw axis of the cutting screw conveyor in the front gathering region in at least one conveying direction;
a picking gap defined behind the cutting screw conveyor in the working direction, wherein the plants are guided by the cutting screw conveyor along the screw axis through the picking gap while separating the produce; and
the screw axis of the cutting screw conveyor is oriented transversely or approximately transversely to the working direction;
wherein the conveying direction extends in the direction of the screw axis, and the conveying direction is substantially parallel to the screw axis.

2. An apparatus of claim 1, wherein the picking gap has a longitudinal axis that is oriented transverse or approximately transverse to the working direction and parallel or approximately parallel to the ground.

3. An apparatus of claim 1, wherein the holder further comprises a plurality of blades, and the conveying device guiding and cutting the plants against at least one of the blades.

4. An apparatus of claim 1, wherein the conveying device transports the plants in a direction parallel or approximately parallel to the ground.

5. An apparatus of claim 1, wherein the screw axis of the cutting screw conveyor is oriented parallel or approximately parallel to the ground.

6. An apparatus of claim 1, further comprising a drive to operate the cutting screw conveyor in an upwardly rotating manner as viewed from the front of the apparatus.

7. An apparatus of claim 3, wherein the blades are curved and at least partially engage around the cutting screw conveyor.

8. An apparatus of claim 1, further comprising a plurality of guide elements fastened to the holder at a transverse spacing from one another in the working direction, said guide elements being arranged in front of the conveying device, extending upwardly and their upper regions being inclined, curved or angled in the conveying direction.

9. An apparatus of claim 1, further comprising at least one auxiliary transport apparatus provided by the holder, wherein the at least one auxiliary transport apparatus gathers and transports the plants above the conveying device.

10. An apparatus of claim 9, wherein the auxiliary transport apparatus comprises a chain conveyor.

11. An apparatus of claim 9, wherein the plants are gathered from the conveying device by the auxiliary transport apparatus and are guided through the picking gap.

12. A method for harvesting produce bearing plants, comprising:
providing at least one conveying device with a front gathering region, the conveying device further comprising a cutting screw conveyor rotating about a screw axis and a picking gap behind the cutting screw conveyor in a working direction;
moving the conveying device in the working direction relative to the plants such that the plants come in contact with the cutting screw conveyor in the front gathering region;
gathering and transporting the plants in an at least one conveying direction using the cutting screw conveyor; and
guiding the plants by the cutting screw conveyor along the screw axis through the picking gap and subjecting the plants to a picking process to separate the produce from the plants;
wherein the screw axis of the cutting screw conveyor is oriented transverse or substantially transverse to the working direction, and
the conveying direction extends in the direction of the screw axis.

13. A method of claim 12, further comprising:
providing a plurality of curved blades; and
cutting the plants by the cooperation of the cutting screw conveyor and the plurality of curved blades, the cutting step being before the plants are subjected to the picking process.

14. A picking apparatus comprising:
at least one holder movable in a working direction, the holder having at least one conveying device with a front gathering region, wherein produce bearing plants come in contact with the conveying device in the front gathering region, the conveying device being operable to gather and transport plants in at least one conveying direction;
the holder further comprising a plurality of curved blades, the conveying device guiding and cutting the plants against at least one of the curved blades;
a picking gap defined behind the conveying device, wherein the plants are guided through the picking gap while separating the produce; and
a cutting screw conveyor supported at the holder, the plurality of curved blades at least partially engaging around the cutting screw conveyor, the cutting screw conveyor being rotatable about a screw axis oriented transversely or approximately transversely to the working direction;
wherein the conveying direction extends in the direction of the screw axis.

* * * * *